(12) United States Patent
Guseva (10) Patent No.: US 9,342,916 B2
(45) Date of Patent: May 17, 2016

(54) COARSE-TO-FINE MULTPLE DISPARITY CANDIDATE STEREO MATCHING (75) Inventor: Tatiana Yurievna Guseva, St. Petersburg (RU)

(73) Assignee: INTEL CORPORATION, Santa Clara, CA (US)

( * ) Notice: Subject to any disclaimer, the term of this patent is extended or adjusted under 35 U.S.C. 154(b) by 3 days.

(21) Appl. No.: 13/993,258

(22) PCT Filed: Dec. 30, 2011

(86) PCT No.: PCT/RU2011/001058
§ 371 (c)(1),
(2), (4) Date: Jun. 11, 2013

(87) PCT Pub. No.: WO2013/100790
PCT Pub. Date: Jul. 4, 2013

(65) Prior Publication Data
US 2013/0314409 A1 Nov. 28, 2013

(51) Int. Cl.
*G06T 15/00* (2011.01)
*G06K 9/62* (2006.01)
*G06T 19/00* (2011.01)
*G06T 7/00* (2006.01)
*G06K 9/32* (2006.01)
(Continued)

(52) U.S. Cl.
CPC .............. *G06T 15/00* (2013.01); *G06T 7/0075* (2013.01); *G06K 9/32* (2013.01); *G06K 9/6202* (2013.01); *G06K 9/6203* (2013.01); *G06K 9/6204* (2013.01); *G06T 7/001* (2013.01); *G06T 15/10* (2013.01); *G06T 17/00* (2013.01); *G06T 17/20* (2013.01); *G06T 19/00* (2013.01)

(58) Field of Classification Search
CPC ......... G06T 19/00; G06T 17/20; G06T 17/00; G06T 15/10; G06T 15/00; G06T 7/001; G06K 9/6203; G06K 9/6204; G06K 9/32; G06K 9/6202
USPC .......... 382/100, 174, 154, 107, 103; 345/419, 345/427, 426; 348/46, 43, 51
See application file for complete search history.

(56) References Cited

U.S. PATENT DOCUMENTS

| 7,333,651 | B1 * | 2/2008 | Kim ..................... G06K 9/6202 345/419 |
| 7,570,804 | B2 * | 8/2009 | Kim et al. ..................... 382/154 |

(Continued)

FOREIGN PATENT DOCUMENTS

| CN | 102129567 A | 7/2011 |
| CN | 102239503 A | 11/2011 |
| EP | 1 610 271 A2 | 12/2005 |

OTHER PUBLICATIONS

"PCT Notification of Transmittal of the International Search Report and the Written Opinion of the International Searching Authority, or the Declaration", dated Oct. 18, 2012, for International Application No. PCT/RU2011/001058, 14pgs.

(Continued)

*Primary Examiner* — Abderrahim Merouan
(74) *Attorney, Agent, or Firm* — Buckley, Maschoff & Talwalkar LLC (57) ABSTRACT

An image processing apparatus, system, and method to generate an estimation of a disparity map for a stereo pair of images based on multiple disparity assignments and a matching cost for each disparity assignment; and generate a final disparity map by refining the estimated disparity map.

18 Claims, 6 Drawing Sheets

(51) Int. Cl.
*G06T 17/00* (2006.01)
*G06T 17/20* (2006.01)
*G06T 15/10* (2011.01)

(56) References Cited

U.S. PATENT DOCUMENTS

| | | | | |
|---|---|---|---|---|
| 8,933,925 | B2* | 1/2015 | Sinha | G06T 7/0065 345/419 |
| 2005/0286756 | A1 | 12/2005 | Hong et al. | |
| 2006/0120594 | A1* | 6/2006 | Kim et al. | 382/154 |
| 2010/0020074 | A1* | 1/2010 | Taborowski et al. | 345/420 |
| 2010/0020178 | A1* | 1/2010 | Kleihorst | G06T 7/002 348/175 |
| 2010/0271511 | A1* | 10/2010 | Ma et al. | 348/239 |
| 2011/0032341 | A1* | 2/2011 | Ignatov et al. | 348/51 |
| 2011/0142328 | A1* | 6/2011 | Friedhoff et al. | 382/154 |
| 2011/0199468 | A1* | 8/2011 | Gallagher | H04N 13/0452 348/59 |
| 2011/0299770 | A1* | 12/2011 | Vaddadi | G06K 9/6211 382/165 |
| 2012/0008857 | A1* | 1/2012 | Choi | 382/154 |
| 2012/0014590 | A1* | 1/2012 | Martinez-Bauza et al. | 382/154 |
| 2012/0050496 | A1* | 3/2012 | Nishigaki | 348/49 |
| 2012/0207388 | A1* | 8/2012 | El Dokor et al. | 382/173 |
| 2013/0208975 | A1* | 8/2013 | Hsu | 382/154 |
| 2014/0148733 | A1* | 5/2014 | Stone | A61B 5/004 600/595 |

OTHER PUBLICATIONS

Bleyer, M. et al., "A layered stereo matching algorithm using image segmentation and global visibility constraints", ISPRS Journal of Photogrammertry & Remote Sensing, vol. 59, No. 3, May 1, 2005, ISSN: 0924-2716, XP027806719, (pp. 128-150, 24 total pages).

Liu, T. et al.: "Segmentation-Based, Robust and Fast Local Stereo Matching with Medical Application", Journal of Computer-Aided Design and Computer Graphics, vol. 22, No. 1, Jan. 31, 2010, 8 pages.

Liu, S. et al., "Timely stereo video object segmentation based on disparity and moving detection", Chinese Journal of Stereology And Image Analysis, vol. 16, No. 1, Mar. 31, 2011, 4 pages.

Notice of First Office Action dated Jan. 19, 2016 and Search Report issued by the Chinese State Intellectual Property Office from corresponding CN Application No. 201180076169.X, along with unofficial English translation, 13 pages total.

\* cited by examiner

COARSE-TO-FINE MULTIPLE DISPARITY CANDIDATE STEREO MATCHING

BACKGROUND

Generating three dimensional (3-D) information from a stereo image is a significant task in 3-D and other multi-view image processing. It is noted that a real-world point (e.g., a viewed object) projects to a unique pair of corresponding pixels in stereo images. Based on the stereo images, it may be possible to extract or otherwise generate 3-D information from the stereo images corresponding to the same real-world point. Determining the location of a point in the projected stereo images from the subject point generally results in a correspondence problem. Solving the correspondence problem may include generating an estimation of a disparity map.

The difference in the position of the two corresponding points of the stereo images associated with the same real-world image is generally referred to as a disparity. A map of disparity in the projection of multiple real-world points in left and right (i.e., stereo) images may be referred to as a disparity map. Some heretofore techniques to generate a disparity map include local, global, and iterative techniques. However, each of these techniques is not without their own shortcomings. For example, with a local approach, the estimation of the disparity map depends on the intensity values within a finite window and the computational cost is thus low. Conversely, a global approach may use non-local constraints to reduce sensitivity to local regions such as occluded and textureless regions and the computational cost of the global approach is thus high compared to the local approach. Additionally, previous iterative approaches may employ coarse-to-fine techniques that typically operate on an image pyramid where results from the coarser levels are used to define more local search at finer levels. Improving the efficiency of such iterative approaches is therefore important.

BRIEF DESCRIPTION OF THE DRAWINGS

Aspects of the present disclosure herein are illustrated by way of example and not by way of limitation in the accompanying figures. For purposes related to simplicity and clarity of illustration rather than limitation, aspects illustrated in the figures are not necessarily drawn to scale. Further, where considered appropriate, reference labels have been repeated among the figures to indicate corresponding or analogous elements.

DETAILED DESCRIPTION

The following description describes an image processor device or system that may support processes and operation to improve efficiency and accuracy of generating disparity maps. The disclosure herein provides numerous specific details such regarding a system for implementing the processes and operations. However, it will be appreciated by one skilled in the art(s) related hereto that embodiments of the present disclosure may be practiced without such specific details. Thus, in some instances aspects such as control mechanisms and full software instruction sequences have not been shown in detail in order not to obscure other aspects of the present disclosure. Those of ordinary skill in the art will be able to implement appropriate functionality without undue experimentation given the included descriptions herein.

References in the specification to "one embodiment", "some embodiments", "an embodiment", "an example embodiment", "an instance", "some instances" indicate that the embodiment described may include a particular feature, structure, or characteristic, but that every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Some embodiments herein may be implemented in hardware, firmware, software, or any combinations thereof. Embodiments may also be implemented as executable instructions stored on a machine-readable medium that may be read and executed by one or more processors. A machine-readable storage medium may include any tangible non-transitory mechanism for storing information in a form readable by a machine (e.g., a computing device). In some aspects, a machine-readable storage medium may include read only memory (ROM); random access memory (RAM); magnetic disk storage media; optical storage media; flash memory devices; and electrical and optical forms of signals. While firmware, software, routines, and instructions may be described herein as performing certain actions, it should be appreciated that such descriptions are merely for convenience and that such actions are in fact result from computing devices, processors, controllers, and other devices executing the firmware, software, routines, and instructions.

Stereo pair images projections corresponding to a common object may be processed to generate multi-view or three-dimensional (3-D) images, for example, by extracting 3-D structures of a scene from the stereo images. This is based on the fact that a real-world point projects to unique pair of corresponding pixels in associated stereo images. It is thus possible to restore the three-dimensional information of the object point when the corresponding pixels are determined.

Figure 1:
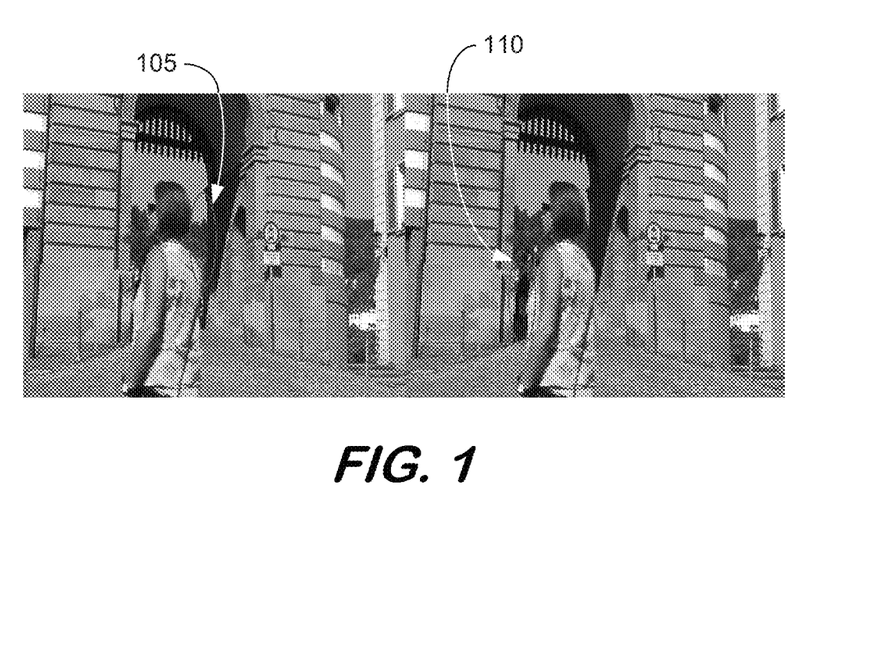
FIG. 1 is an illustrative depiction of corresponding stereo pair images, according to some embodiments herein.

FIG. 1 is an illustrative depiction of stereo pair images 105 and 110 resulting from projections from a real-world image. In some aspects, image 105 may be referred to a left image and image 110 may be referred to as a right image of the stereo pairs.

Figure 2:
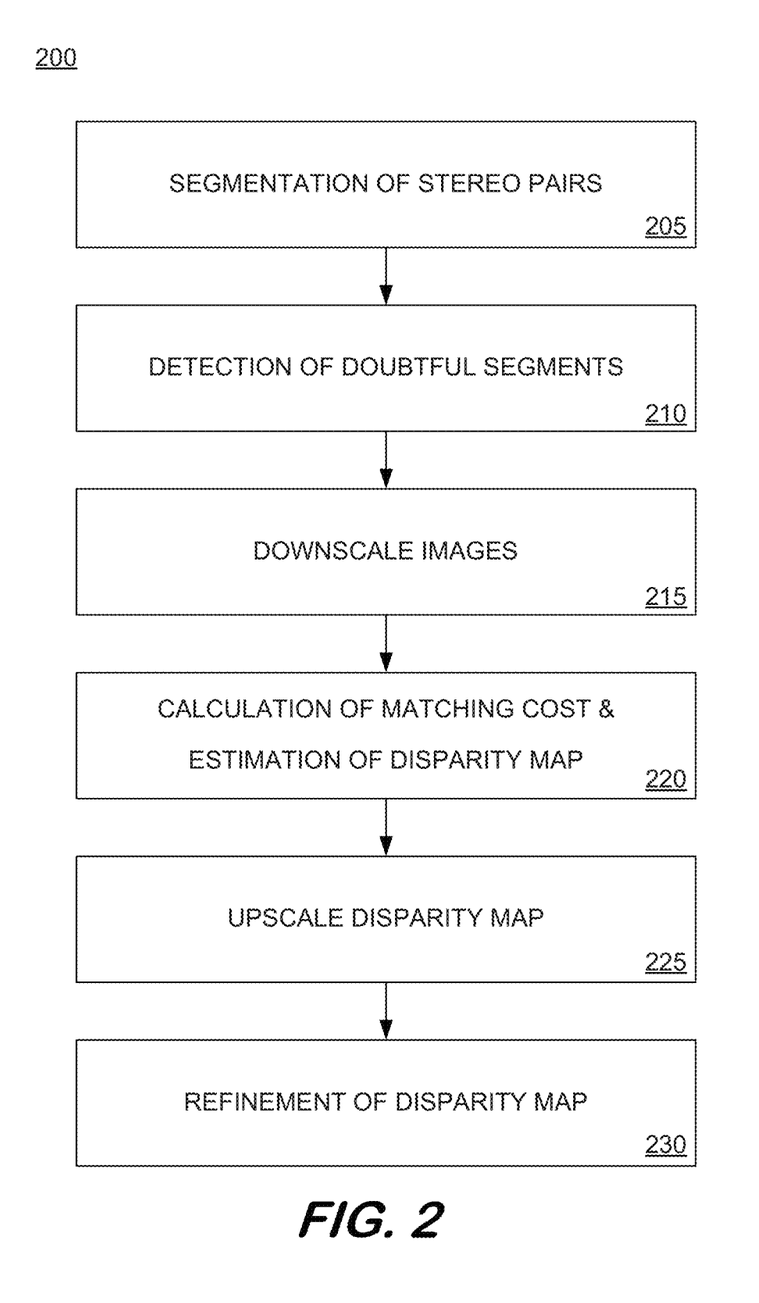
FIG. 2 is a flow diagram of a process, in accordance with one embodiment.

In one embodiment, methods and systems herein estimate a disparity map of rectified stereo pair based on multi-peak candidate sets combined with a matching cost ambiguity determination. In some aspects, a coarse-to-fine methodology is used to reduce computational requirements associated with the determination of the disparity map. As a general overview of some embodiments, FIG. 2 is an illustrative flow diagram of a process 200 for generating a disparity map estimation.

Process 200 may include an operation 205 to segment a pair of stereo images. The stereo images are thus the inputs to process 200 and may be referred to as the input stereo pair ($I_l^{in}$, $I_r^{in}$). At operation 210, a determination is made to classify the segments corresponding to the input stereo pair $I_l^{in}$ and $I_r^{in}$ as "doubtful" or trust worthy (i.e., "un-doubtful") for use in the disparity map estimation process. In particular, some embodiments make a determination whether the segments are "doubtful", where such determination may be used in later processing operations. At operation 215, the input stereo pair may be downscaled by a predetermined factor. The downscaling may be performed at this juncture of the process 200 in an effort to reduce the computational required to generate the disparity map estimation. In some aspects, the scale factor is referred to herein as $t_{sc}$. Continuing to operation 220, an estimation of a disparity map, D, is performed using the scaled images $I_l$ and $I_r$ of the stereo pair. Additional details regarding the factors and considerations used in determining the disparity map estimation are provided herein below.

Process 200 further includes operation 225 for upscaling the estimated disparity map D generated at operation 220. The upscaling is provided to compensate for the downscaling of operation 215. It is noted that the downscaling and the upscaling occur before and after the calculation of the estimated disparity map. In this manner, the computational resources needed to calculate the estimated disparity map may be reduced. Operation 230 includes a refinement of the estimated disparity map $D_l$. In some aspects, left and right images are used as an additional image for right and left image, respectively.

As stated above, process 200 is a flow diagram of a general overall of an embodiment of a method herein. Following herein below is a presentation of the operations of process 200 in greater detail to illustrate aspects of the present disclosure. Some of the detailed aspects are reflected in process 300 of FIG. 3.

Figure 3:
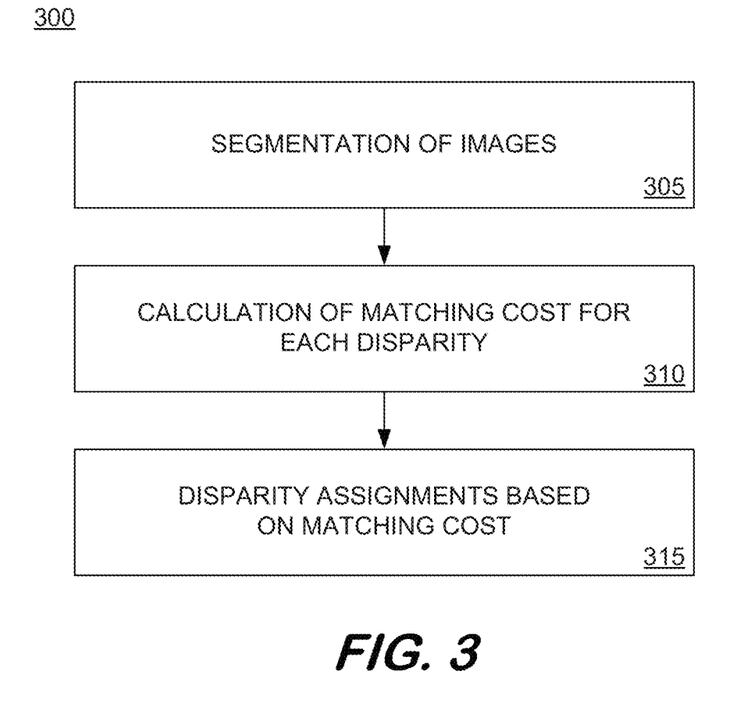
FIG. 3 is a flow diagram of a process 300 related to an estimation of a disparity map, in accordance with one embodiment.

FIG. 3 includes a segmentation operation at 305. Regarding the segmentation operation 305, segmentation may be implemented, in some embodiments, by denote an image as X and a set of image segments as $S_X$. The image X may be iteratively filtered $N_{ms}$ times and a pixel $F_{(i,j)}$ ((i, j) is pixel location) of filtered image F may be defined as follows:

$$F_{(i,j)} = \underbrace{f_{ms}(f_{ms}(\ldots (f_{ms}(X))))_{(i,j)}}_{N_{ms}}$$

where $$f_{ms}(Y)_{(i,j)} = \frac{1}{|\tilde{W}_{(i,j)}|} \sum_{(i',j') \in \tilde{W}_{(i,j)}} \|Y_{(i,j)} - Y_{(i',j')}\|_2,$$

$\tilde{W}_{(i,j)} = \{(i',j') \in W_{(i,j)} : \|Y_{(i,j)} - Y_{(i',j')}\|_2 \le h_r\}$, $W_{(i,j)}$ is $(2h_{sp}+1) \times (2h_{sp}+1)$ window with its center at pixel (i, j).

The segments $s \in S_X$ may be defined according as follows: two neighboring pixels $S_{(i_0, j_0)}$ and $X_{(i_1, j_1)}$ belong to the same segment if and only if a color distance of filtered pixels $F_{(i_0, j_0)}$ and $F_{(i_1, j_1)}$ is smaller than a threshold $thr_s$. That is, $$\|F_{(i_0,j_0)} - F_{(i_1,j_1)}\|_2 < thr_s.$$

Note, $$\bigcup_{s \in S_X} s = X \text{ and } \forall s_0, s_1 \in S_X s_0 \cap s_1 = \emptyset.$$

Thus, the image may be segmented into segments where segments consist of pixels having a color distance between them that is less than a threshold value. The threshold value may be predetermined in some embodiments.

Regarding the detection of doubtful segments of operation 210, doubtful segments may be determined or detected by denoting an image as X and a set of image segments $S_X$. A segment $s \in S_X$ may be defined as "doubtful" if it does not contain $n_d \times n_d$ block of pixels. That is, $$\nexists (i_s, j_s) : \{0 \le i_s \le w - n_d, 0 \le j_s < h - n_d, [i_s : i_s + n_d, j_s : j_s + n_d] \in s\}$$

where w and h are width and height of image X. Herein, denote as $S_X^{ud}$ denotes a set of "un-doubtful" segments and $S_X^d$ denotes a set of "doubtful" segments. Accordingly, $$S_X^d \cup S_X^{ud} = S_X, S_X^d \cap S_X^{ud} = \emptyset.$$

A segment classified as doubtful may not include sufficient information to determine a disparity map.

Operation 215 of process 200 includes downscaling the input stereo pair images. In one embodiment, the images may be downscaled by a factor $t_{sc}$. Hereto, X denotes an image and $S_X$ represents a set of image segments. For each $(i, j) \in [0 : \lfloor w/t_{sc} \rfloor, 0 : \lfloor h/t_{sc} \rfloor]$, where w and h are image X width and height, we define $\tilde{W}_{(i,j)}$, $W_{(i,m)}^{ud}$ and $W_{(i,j)}$ as $$\tilde{W}_{(i,j)} = \{(i', j') : \lfloor i'/t_{sc} \rfloor = i, \lfloor j'/t_{sc} \rfloor = j\},$$

$$W_{(i,j)}^{ud} = \{\arg\max_{s \in S_X^{ud}} |s \cap \tilde{W}_{(i,j)}|\} \cap \tilde{W}_{(i,j)},$$

$$W_{(i,j)} = \{\arg\max_{s \in S_X} |s \cap \tilde{W}_{(i,j)}|\} \cap \tilde{W}_{(i,j)}.$$

where $\tilde{W}_{(i,j)}$ represents a square block with its left top corner at current pixel, $W_{(i,j)}^{ud}$ represent maximum intersection of the square block with some 'undoubtful' segment. From all 'undoubtful' segments; we select the one which gives maximal intersection; $W_{(i,j)}$ is similar to $W_{(i,j)}^{ud}$, the only difference is that we regard all segments (not only 'undoubtful' as in previous case).

Pixel $Y_{(i,j)}$ (where (i, j) is pixel location) of scaled image Y is defined as:

$$Y_{(i,j)} = \begin{cases} \dfrac{1}{|W_{(i,j)}^{ud}|} \displaystyle\sum_{(i',j') \in W_{(i,j)}^{ud}} X_{(i',j')}, & \text{if } |W_{(i,j)}^{ud}| \ne 0, \\ \dfrac{1}{|W_{(i,j)}|} \displaystyle\sum_{(i',j') \in W_{(i,j)}} X_{(i',j')}, & \text{otherwise.} \end{cases}$$

The scaled segment $s_{sc}$ corresponding to a segment $s \in S_X$ is defined as:

$$s_{sc} = \begin{cases} (i,j): & 0 \leq i < w/t_{sc}, \\ & 0 \leq j < h/t_{sc}, \\ s = \begin{cases} \arg\max_{s' \in S_X^{ud}} |s' \cap \tilde{W}_{(i,j)}|, & \text{if } |\tilde{W}_{(i,j)}| \neq 0, \\ \arg\max_{s' \in S_X} |s' \cap \tilde{W}_{(i,j)}|, & \text{otherwise.} \end{cases} \end{cases}$$

Operation 310 includes detailed aspects of process 200, process 220 for calculating a matching cost of a segment, where the matching cost is denoted by $C_s(d)$. The calculation of the matching cost considers whether the segment for which the matching cost is being calculated is "un-doubtful" or "doubtful".

In the instance a segment is determined or detected as being "un-doubtful" (i.e., not "doubtful"), some embodiments denote as I and $I^d$ a main and additional images, respectively. It is noted that since part of an "un-doubtful" segment s can be occluded, warped segment $s_d$ by disparity d to the additional image $I^d$ can overlap with several segments (where a set of such segments is denoted $S^o$), and $$s_d = \{(x,y): 0 \leq x < w, 0 \leq y < h, (x-d,y) \in s\},$$

$$S^o = \{s' \in S^a: s' \cap s_d \neq \emptyset\},$$

where w and h are the width and height of additional image $I^a$. Herein, we define a corresponding segment $s_d^o$ as a segment that intersects with warped segment $s_d$, maximal. This aspect may be represented as, $$s_d^o = \arg\max_{s' \in S^o} |s' \cap s_d|.$$

The energy $C_s(d)$ of matching errors for the "un-doubtful" segment s is defined as:

$$C_s(d) = \begin{cases} \sum_{(x,y) \in s_d \cap s_d^o} \|I^a_{(x,y)} - I_{(x-d,y)}\|_2, & \text{if } |s_d \cap s_d^o| > n_d \cdot n_d, \\ C_{max}, & \text{otherwise.} \end{cases}$$

In the instance the segment is determined or detected as being "doubtful", the matching cost is determined according to the following where I and $I^a$ refer to the main and additional images, respectively. A window $W_s$ may be defined for "doubtful" segment s as pixels (i, j) such that a distance between pixel (i, j) and segment s is less than $n_d$. That is, $$W_s = \{(i,j): s_{(i,j)} \in S_I^d, \exists (i',j') \in s: (i-i')^2 - (j-j')^2 \leq n_d \cdot n_d\},$$

where $s_{(i,j)}$ is segment to which pixel (i, j) belongs.

The energy $C_s(d)$ of matching errors for a "doubtful" segment s is defined as:

$$C_s(d) = \frac{1}{|W_s|} \sum_{(x,y) \in W_s} \|I^a_{(x,y)} - I_{(x-d,y)}\|_2.$$

It should be appreciated by one of ordinary skill in the art that the terms "doubtful" and "un-doubtful" are used as a matter of naming convention convenience and that these terms are defined by the equations and other specified relationships disclosed herein.

Having determined the matching cost for the "doubtful" and "un-doubtful" segments, the estimation of the disparity map of operation 315 (e.g., operation 220 introduced in FIG. 2) includes determining disparity candidates based on a matching cost minimum of the segments and assigning the disparity candidates to one of a plurality of segment classifications based on the matching cost minimum of the segments to generate the estimated disparity map of the stereo images. In some embodiments, this aspect of the present disclosure may include (i) detecting or determining which of the plurality of segment classifications each of the segments fit, (ii) assigning the disparity candidate segments to the detected classification, (iii) refining the disparity candidate sets, and (iv) refining of the disparity map. These four operations may, in general, be applied to segments for each of the plurality of segment classifications.

In the disclosure below it should be appreciated by one of ordinary skill in the art that the terms used to name the plurality of segment classifications are used as a matter of naming convention convenience and that these terms are defined by the equations and other specified relationships disclosed herein.

In one embodiment, detection of disparity candidates includes detecting matching cost minimums $M_s$. That is, detect $d \in [d_s^0, d_s^1]$ such that $$\exists d_r, d_l: C_s(d) = \min_{d' \in [d-d_l, d+d_r]} C_s(d'),$$

$$C_s(d) < C_s(d - d_l) - \delta,$$

$$C_s(d) < C_s(d + d_r) - \delta,$$

where $d_s^0 = \max\{d: \forall d' < d \; C_s(d') = C_{max}\}$ and $d_s^1 = \min\{d: \forall d' > d \; C_s(d') = C_{max}\}$.

Further, in some embodiments, we define disparity d as a segment s disparity candidate if and only if there exists a matching cost minimum d' such that, $$d = \arg\max_{\hat{d} \in W_{d'}} |s_{\hat{d}} \cap s_{\hat{d}}^o|,$$

where $W_{d'} = \{\hat{d}: |C_s(d') - C_s(\hat{d})| < \delta, s_{\hat{d}}^o = s_{d'}^o\}$.

In one embodiment, refinement of disparity candidates includes denoting an image as I and set of segment s disparity candidates as $D_s$. For each image I, with "un-doubtful" segment $s \in S_I^{ud}$ and $N_s$ being a set of similar segments, to which the disparity is assigned. That is, $$N_s = \left\{ s' \in S_I^{ud} \cap S_I^{def} : \left| \frac{1}{|s'|} \sum_{(i,j) \in s'} I_{(i,j)} - \frac{1}{|s|} \sum_{(i,j) \in s} I_{(i,j)} \right| < thr_{sim} \right\},$$

where $s_I^{def}$ is set of segments to which disparity is assigned.

In one embodiment, a value d is removed from disparity candidate set $D_s$ if warped segment $s_d$ intersects with some warped similar segment $s' \in N_s$. That is, $$\exists s' \in N_s: s'_{\hat{d}_{s'}} \cap s_d \neq \emptyset,$$

where $\hat{d}_{s'}$ is disparity assigned to segment s'.

As introduced above, the process herein includes disparity assignment to each of the plurality of segment classifications. In one instance a disparity assignment is made for "indubious" segments. In one embodiment, we denote as I and $I^a$ the main and additional images, respectively. First, a selection is made of "un-doubtful" segments $s \in S_I^{ud}$ such that disparity candidate set $D_s$ consists of one element. That is, matching cost field $C_s(d)$ has one local minimum, $$S'_I = \{s \in S_I^{ud} : |D_s| = 1\}.$$

In one embodiment, we denote as $S_I^{ind}$ a set of segments $s \in S'_I$ such that, corresponding segment $s_{\hat{d}}^o$ is "un-doubtful", i.e. $s_{\hat{d}}^o \in S_{I^a}^{ud}$, matching cost $C_s(\hat{d})$ is less that $c_{cost} \cdot |s_{\hat{d}}|$, intersection of warped segment $s_{\hat{d}}$ and corresponding segment $s_{\hat{d}}^o$ is greater than $c_{ovl} \cdot |s_{\hat{d}}|$, where $\hat{d}$ is segment s disparity candidate.

As used herein, segments $s \in S_I^{ind}$ are called "indubious" segments, where "indubious" segments are segments that have one well defined local minimum in the matching cost field.

Finally, disparity candidate $\hat{d}$ is assigned to each "indubious" segment, for which a disparity is not assigned yet.

Figure 4:
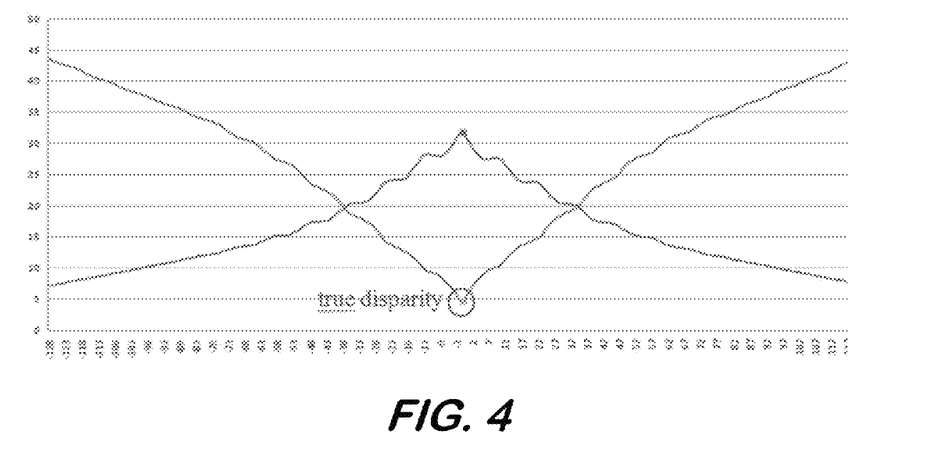
FIG. 4 illustrates a graph of matching cost and intersection size fields of a classification of an "indubious" segment, in accordance with an embodiment.

FIG. 4 is an example of matching cost and intersection size field of for an "indubious" segment. In FIG. 4, the matching cost is represented by line 405, line 410 represents the size of intersection of warped and corresponding segments, 415 represents the matching cost of the disparity candidate, and 420 represents the intersection size of the disparity candidate.

In one instance a disparity assignment is made for "stable" segments. In one embodiment, we denote as I and $I^a$ the main and additional images, respectively. A selection is made of "un-doubtful" segments $s \in S_I^{ud}$ such that there exists disparity candidates $d \in D_s$ such that corresponding segment $s_d^o$ is "un-doubtful". That is, $$S'_I = \{s \in S_I^{ud} : D_s^{ud} \neq \emptyset\},$$

where $D_s^{ud} = \{d \in D_s : s_d^o \in S_{I^a}^{ud}\}$. For each segment $s \in S'_I$ detect disparity candidate $\hat{d}_s \in D_s^{ud}$ which matching cost is minimum. Accordingly, $$\hat{d}_s = \arg\max_{d \in D_s^{ud}} C_s(d).$$

Let $$S''_I = \{s \in S'_I : C_s(\hat{d}_s) \geq c_{cost} \cdot |s_{\hat{d}_s}|, |s_{\hat{d}_s} \cap s_{\hat{d}_s}^o| < c_{ovl} \cdot |s_{\hat{d}_s}|\},$$

where $s_{\hat{d}_s}$ and $s_{\hat{d}_s}^o$ are the warped and corresponding segment, respectively.

Herein, a segment $s \in S''_I$ is called "stable" if one of the following conditions is fulfilled:
1. Set $D_s^{ud}$ consists of one element $\hat{d}_s$,
2. Matching cost $C_s(\hat{d}_s)$ is well defined local minimum, i.e.

$$\min_{d \in D_s^{ud} \setminus \hat{d}_s} C_s(d) - C_s(\hat{d}_s) > c_{stable} \cdot |s|,$$

3. Let $D'_s = \{d \in D_x^{ud} : C_x(d) - C_s(\hat{d}_s) < c_{stable} \cdot |s|, \quad C_s(d) < c_{cost} \cdot |s_d|\}$ and $$\tilde{d}_s = \arg\max_{d \in D'_s} |s_d^o \cap s_d|.$$

Disparity candidate $\tilde{d}_s$ intersection is well defined, i.e.

$$|s_{\tilde{d}_s}^o \cap s_{\tilde{d}_s}| - o_s > c_{sovl} \cdot |s|,$$

where $o_s = \begin{cases} \max_{d \in D'_s \setminus \tilde{d}_s} |s_d \cap s_d^o|, & \text{if } |D'_s| > 1, \\ 0, & \text{otherwise.} \end{cases}$ If one of first two conditions (i.e. 1 or 2) is fulfilled, disparity $\hat{d}_s$ is assigned to "stable" segment s for which a disparity is not yet assigned. Otherwise, disparity $\tilde{d}_s$ is assigned (condition 3).

Figure 5:
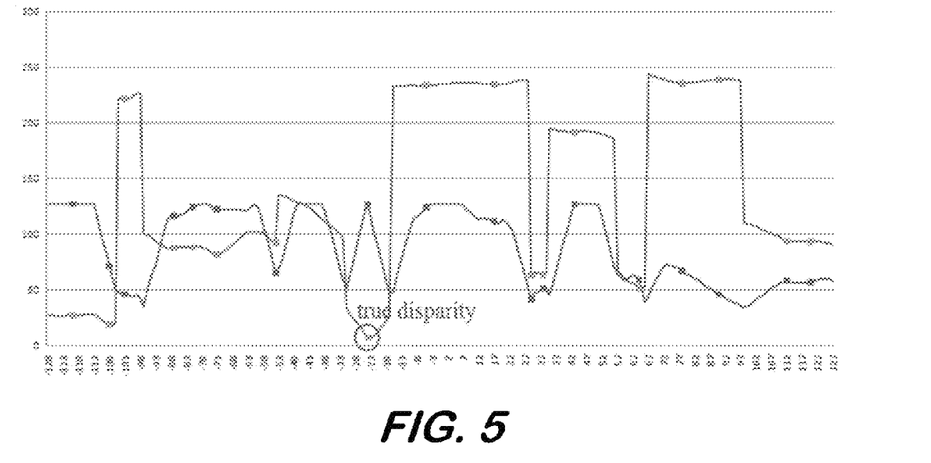
FIG. 5 illustrates a graph of matching cost and intersection size fields of a classification of a "stable" segment, in accordance with an embodiment.

FIG. 5 is an illustrative example of matching cost and intersection size field of for a "stable" segment. In FIG. 5, the matching cost is represented by line 505, line 510 represents the size of intersection of warped and corresponding segments, 515 represents the matching cost of the disparity candidate, and 520 represents the intersection size of the disparity candidate.

In one instance a disparity assignment is made for "unstable" segments. In one embodiment, we denote I as the input image. We further denote as $S'_I$ a set of "un-doubtful" segments $s \in S_I^{ud}$ such that disparity candidate set $D_s$ is not empty and disparity is assigned to some "un-doubtful" adjacent segment.

For each segment $s \in S'_I$ a selection of disparity candidates is made such that a corresponding matching cost is sufficiently small and a similar disparity is assigned to some "un-doubtful" adjacent segment. That is, $$D'_s = \left\{ d \in D_s : C_s(d) - \min_{d \in D_s} C_s(d) < c_{stable} \cdot |s|, \exists s' \in N_s : |d - d_{s'}| < thr_n \right\},$$

where $N_s$ is a set of "un-doubtful" adjacent segments for which a disparity is assigned to and $d_{s'}$ is disparity assigned to segment $s' \in N_s$.

Segment $s \in S'_I$ is called "un-stable" if set $D'_s$ is not empty and $$|s_{\hat{d}_s}^o \cap s_{\hat{d}_s}| < c_{size} \cdot |s_{\hat{d}_s}|,$$

$$|s_{\hat{d}_s}^o \cap s_{\hat{d}_s}| - o_s > c_{stable} \cdot |s|,$$

where $$\hat{d}_s = \operatorname*{argmax}_{d \in D'_s} |s_d^o \cap s_d| \text{ and}$$

$$o_s = \begin{cases} \max_{d \in D'_s \setminus \hat{d}_s} |s_d^o \cap s_d|, & \text{if } |D'_s| > 1, \\ 0, & \text{otherwise.} \end{cases}$$

The disparity $\hat{d}_s$ is assigned to "un-stable" segments for which a disparity is not yet assigned.

Figure 6:
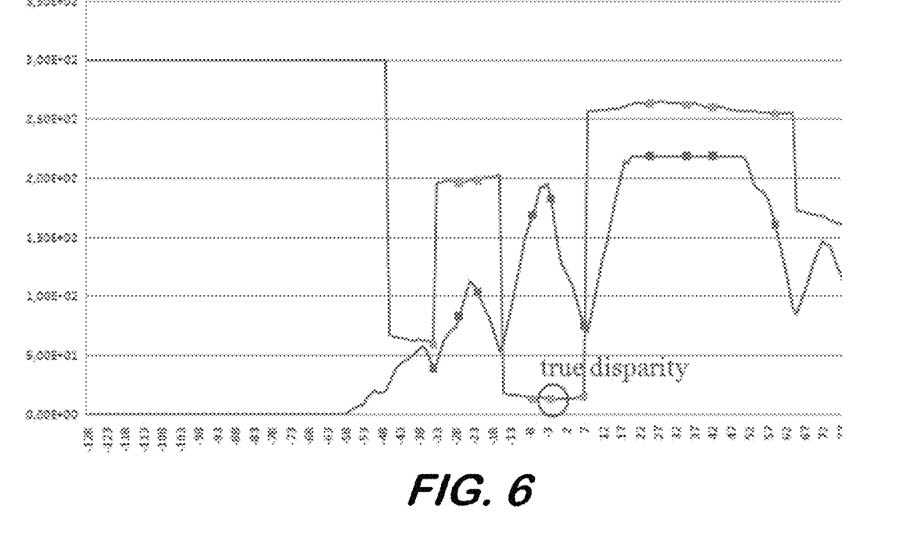
FIG. 6 illustrates a graph of matching cost and intersection size fields of a classification of an "unstable" segment, in accordance with an embodiment.

FIG. 6 is an illustrative example of matching cost and intersection size field of for a "un-stable" segment. In FIG. 6, the matching cost is represented by line 605, line 610 represents the size of intersection of warped and corresponding segments, 615 represents the matching cost of the disparity candidate, and 620 represents the intersection size of the disparity candidate.

In one instance a disparity assignment is made for "unoccluded" segments. In one embodiment, we denote I as the input image and $S'_I$ as a set of segments $s \in S_I$ such that disparity candidate set $D_s$ is not empty and disparity is assigned to some adjacent segment.

For each segment s∈S'$_I$, we select disparity candidates such that a similar disparity is assigned to some adjacent segment s'$_d$ ∈N$_s$. That is, $$D'_s = \{d \in D_s : \exists s'_d \in N_s : |d - d_{s'}| < thr_n\},$$

where d$_{s'}$ is disparity assigned to segment s'.
Letting $$\hat{d}_s = \arg\min_{d' \in D'_s} \min_{s' \in N_s} |d - d_{s'}|;$$

segment s∈S'$_I$ is called "un-occluded" if:
1. set D'$_s$ is not empty set;
2. C$_s$($\hat{d}_s$)<c$_{cost}$·|s$_{\hat{d}_s}$|;
3.

$$\text{if } |D'_s| > 1, \min_{d \in D'_s \setminus \hat{d}_s} f(d, N_s) - f(\hat{d}_s, N_s) > thr_{dist},$$

where $$f(d, N_s) = \min_{s' \in N_s} |d - d_{s'}|, N_s$$

is set of adjacent segments, to which disparity is assigned, and –d$_s$ is disparity assigned to segment s'.

This embodiment assigns disparity $\hat{d}_s$ to each "un-occluded" segment s, for which disparity is not yet assigned.

Figure 7:
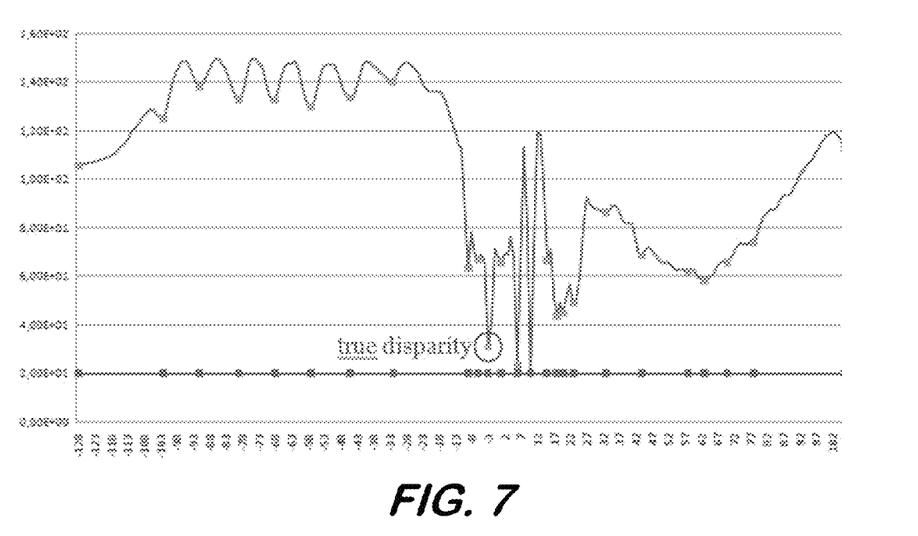
FIG. 7 illustrates a graph of matching cost and intersection size fields of a classification of an "un-occluded" segment, in accordance with an embodiment.

FIG. 7 is an illustrative example of matching cost and intersection size field of for a "un-occluded" segment. In FIG. 7, the matching cost is represented by line 705, line 710 represents the size of intersection of warped and corresponding segments, 715 represents the matching cost of the disparity candidate, and 720 represents the intersection size of the disparity candidate.

In some embodiments a disparity assignment is made for "occluded" segments. In one embodiment, we denote I for an input image. Each segment for which disparity is not yet assigned is detected as "occluded".

For each "occluded" segment s we denote as N'$_s$ a set of segments s'∈S$_I$\S$_I^{occl}$ such that, $$\exists n, s_1, s_2, \ldots, s_n : \{s_1, s_2, \ldots, s_n\} \in S_I^{occl},$$

$$s_1 \in N_s,$$

$$s_i \in N_{s_{i-1}} \; i = 1 \ldots n,$$

$$s_n \in N_{s'},$$

where N$_s$ is set of segment s adjacent segments.
For each "occluded" segment s, assign disparity $$\hat{d}_s = \min_{s' \in N'_s} d_{s'},$$

where d$_{s'}$ is the disparity assigned to segment s'.

Having assigned each segment to one of the plurality of disparity assignment classifications, a disparity map consistency check may be performed in some embodiments. In some aspects, I represents a main image and I$^a$ represents additional images, and S$_I^{def}$ and S$_{I^a}^{def}$ refer to a set of main and additional image segments to which disparity is assigned.

For each segment s∈S$_I$, we detect segments of an additional image to which segment s corresponds. That is, $$N_s = \{s' \in S_{I^a}^{def} : s = s_{d_{s'}}{}^o\},$$

where d$_{s'}$ is the disparity assigned to segment s' and s$_{d_{s'}}{}^o$ is segment corresponding to segment s'.

Each segment s∈S$_I$\S$_I^{def}$ is associated with disparity $\hat{d}_{s'}$, where s'∈N$_s$, if set N$_s$ is not empty and for any segments s$_0$, s$_1$ ∈N$_s$ disparity assigned to them are equal (d$_{s_0}$=d$_{s_1}$).

In some aspects, segment s∈S$_I^{def}$ is then removed from set S$_I^{def}$ if it does not exist s'∈N$_s$ such that |d$_s$+d$_{s'}$|<thr$_{cc}$.

Referring back to FIG. 1, operation 125, the estimated disparity map generated based on the classification of the matching cost for the segments is upscaled. The upscaling operation is performed to compensate for the downscaling operation (e.g., 115) performed on the stereo image segments prior to the estimation of the disparity map. In one embodiment, the upscaling of the disparity map may be performed by, denoting I$^{in}$ and I as the input and downscaled images respectively, for a set of input image segments S$_{I^{in}}$. For each segment s∈S$_{I^{in}}$, $$N_s = \{s' \in S_I : \hat{s} \cap s' \neq \emptyset\},$$

where ŝ is scaled segment corresponding to segment s.
If set N$_s$ is not empty, we assign disparity $$\hat{d}_s = \frac{t_{sc}}{|N_s|} \sum_{s' \in N_s} d_{s'},$$

where d$_{s'}$ is disparity assigned to segment s'.
In some embodiments herein, the disparity map estimation is further refined. The refining may include denoting I and I$^a$ as the main and additional images, respectively.
For each pixel (i, j), denote:

$$\hat{d}_{(i,j)} = \arg\min_{d \in W_d} \frac{1}{|W_{(i,j)}|} \sum_{(i',j') \in W_{(i,j)}} \|I_{(i',j')} - I^a_{(i'-d,j')}\|_2,$$

where W$_{(i,j)}$ is (2n$_d$+1)×(2n$_d$+1) window with its center in pixel (i, j) and $$W_d = \begin{cases} [d_{min}, d_{max}], \\ [\hat{d}_{s_{(i,j)}} - t_{sc}/2, \hat{d}_{s_{(i,j)}} + t_{sc}/2], \end{cases}$$

if disparity is not assigned to segment s$_{(i,j)}$, otherwise, where s$_{(i,j)}$ is segment which pixel (i, j) belongs to and $\hat{d}_{s_{(i,j)}}$ disparity assigned to segment s$_{(i,j)}$. Finally, the disparity $$\hat{d}_s = \left\lfloor \frac{1}{|s|} \sum_{(i,j) \in s} \hat{d}_{(i,j)} + 0.5 \right\rfloor$$

is assigned to each segment s∈S$_I$.

It should be appreciated that the foregoing descriptions of various embodiments for implementing the processes 200 and 300 provide illustrative examples for performing the methods. Additionally, other operations in addition to, in substitute of, and modifications of the disclosed implementations may be included within the scope of the present disclosure.

Figure 8:
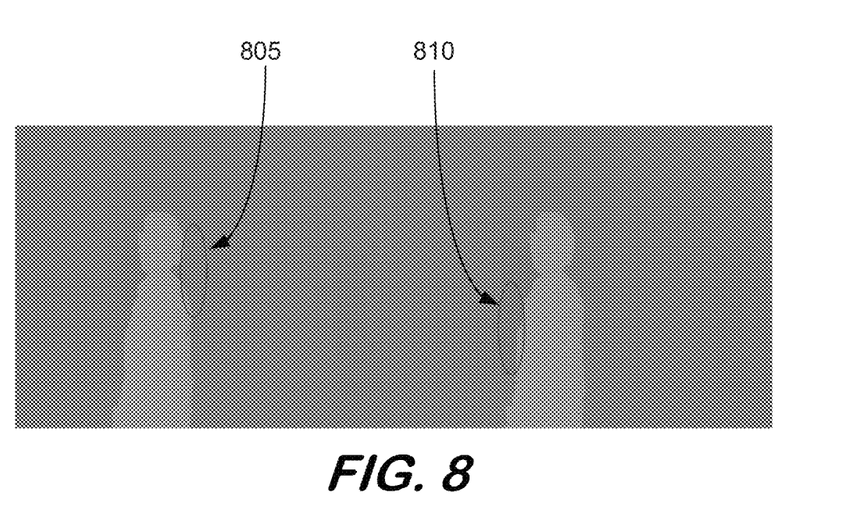
FIG. 8 illustrates an illustrative depiction of a disparity map, in accordance with an embodiment herein.

FIG. 8 is an illustrative depiction of a disparity map estimation generated in accordance with the processes disclosed herein. In the example of FIG. 8, the disparity map estimations at regions 805 and 810 correspond to the input stereo pairs of FIG. 1 at 105 and 110, respectively.

Based on the foregoing, it is seen that the methods and systems herein differs from previous other methods in the aspect of disparity association The methods herein include a scheme in which disparity is assigned in order of matching cost field ambiguity increases. The disclosed method does not use geometrical constraints. In this manner, there is no assumption of matches uniqueness.

In some aspects, the disclosed methods include a scheme of coarser level result propagation. For example, instead of a standard image pyramid finer level segments information is used in some embodiments. These methods efficiently allow for a reduction in computational complexity without an accompanying performance decrease.

It is noted that the methods and systems herein estimate disparity correctly even in hard to process regions such as large occlusion and textureless regions. Moreover, some embodiments provide an estimated disparity is smooth and effectively preserve object boundaries.

Figure 9:
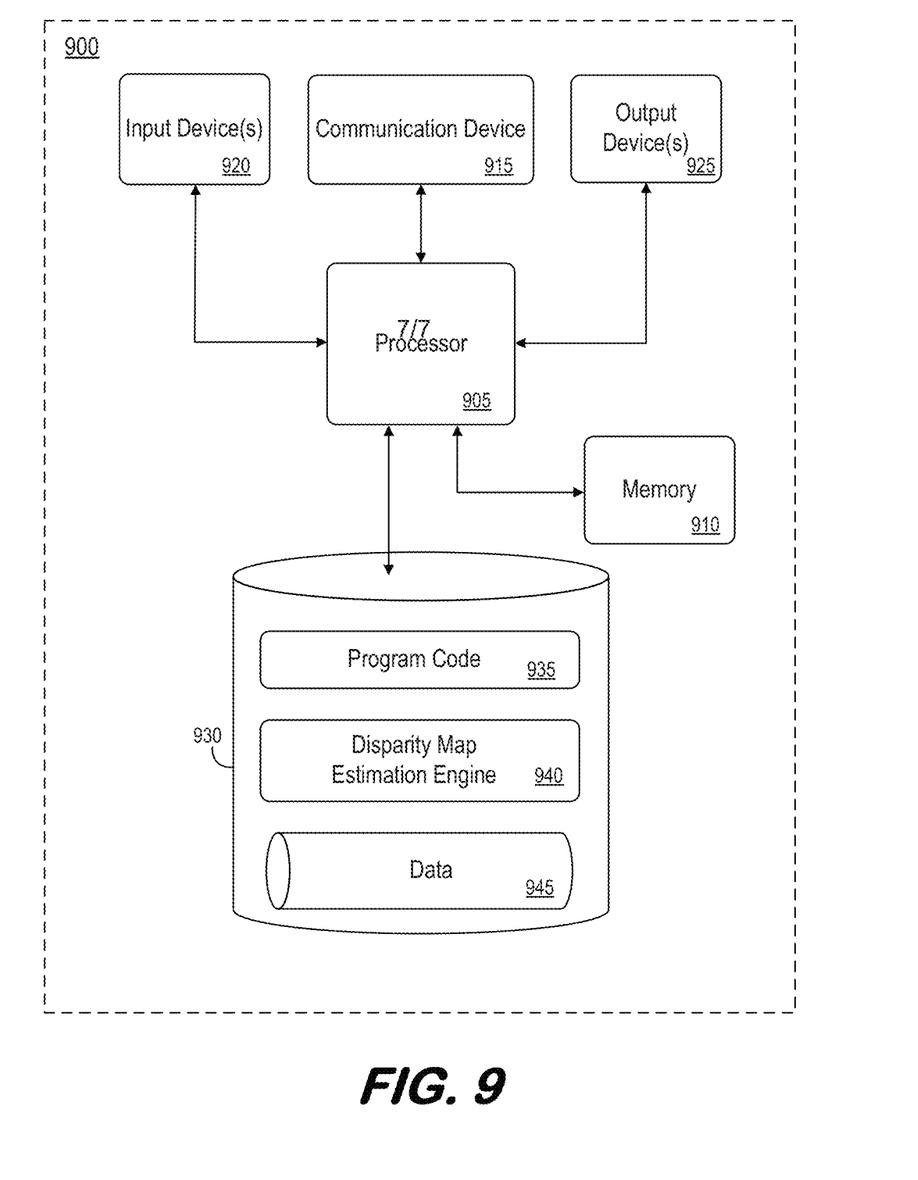
FIG. 9 illustrates a block diagram of an image processing system that may generate disparity maps in accordance with some embodiments herein.

FIG. 9 is a block diagram overview of a system or apparatus 900 according to some embodiments. System 900 may be, for example, associated with any device to implement the methods and processes described herein, including for example client devices and a server of a business service provider that provisions software products. System 900 comprises a processor 905, such as one or more commercially available Central Processing Units (CPUs) in the form of one-chip microprocessors or a multi-core processor, coupled to a communication device 915 configured to communicate via a communication network (not shown in FIG. 9) to another device or system. In the instance system 900 comprises an application server, communication device 915 may provide a means for system 900 to interface with a client device. System 900 may also include a local memory 910, such as RAM memory modules. The system 600 further includes an input device 920 (e.g., a touch screen, mouse and/or keyboard to enter content) and an output device 925 (e.g., a computer monitor to display a user interface element).

Processor 905 communicates with a storage device 930. Storage device 930 may comprise any appropriate information storage device, including combinations of magnetic storage devices (e.g., a hard disk drive), optical storage devices, and/or semiconductor memory devices. In some embodiments, storage device may comprise a database system.

Storage device 930 stores a program code 935 that may provide computer executable instructions for processing requests from, for example, client devices in accordance with processes herein. Processor 905 may perform the instructions of the program 935 to thereby operate in accordance with any of the embodiments described herein. Program code 935 may be stored in a compressed, uncompiled and/or encrypted format. Program code 935 may furthermore include other program elements, such as an operating system, a database management system, and/or device drivers used by the processor 905 to interface with, for example, peripheral devices. Storage device 930 may also include data 945. Data 945, in conjunction with disparity map estimation engine 940, may be used by system 900, in some aspects, in performing the processes herein, such as processes 200 and 300.

All systems and processes discussed herein may be embodied in program code stored on one or more computer-readable media. Such media may include, for example, a floppy disk, a CD-ROM, a DVD-ROM, one or more types of "discs", magnetic tape, a memory card, a flash drive, a solid state drive, and solid state Random Access Memory (RAM) or Read Only Memory (ROM) storage units. Embodiments are therefore not limited to any specific combination of hardware and software.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A computer-implemented method, the method comprising:
generating an estimation of a disparity map for a stereo pair of images based on multiple disparity assignments and a matching cost for each disparity assignment,
wherein generating the disparity map estimation comprises:
segmenting the stereo images;
determining if each segment is doubtful or un-doubtful, wherein a doubtful segment does not comprise a block of pixels greater than $n_d \times n_d$ blocks;
for each doubtful segment, defining a window $W_s$ as pixels (i,j) where a distance between each pixel (i,j) and the doubtful segment is less than $n_d$;
calculating a matching cost for both doubtful and un-doubtful segments wherein the matching cost calculation for a doubtful segment is based on the window $W_s$ and the matching cost calculation for an un-doubtful segment is not based on the window $W_s$;
determining disparity candidates based on a matching cost minimum of the doubtful and un-doubtful segments;
assigning the disparity candidates to one of a plurality of segment classifications based on the matching cost minimum of the doubtful and un-doubtful segments; and
generating a final disparity map by refining the estimated disparity map.

2. The method of claim 1, wherein
the segments each include a plurality of pixels having a color distance within a threshold of each other.

3. The method of claim 2, further comprising:
determining disparity candidates based on the matching cost minimum of the segments; and
assigning the disparity candidates to one of a plurality of segment classifications based on the matching cost minimum of the segments to generate the estimated disparity map of the stereo images.

4. The method of claim 3, wherein each of the segment classifications of the plurality of segment classifications includes a distinct level of segmentation information.

5. The method of claim 1, further comprising:
downscaling the stereo images by a predetermined factor before the generation of the estimated disparity map; and
upscaling the estimated disparity map after the generation thereof by the predetermined factor.

6. The method of claim 1, wherein the disparity map estimation applies to occluded regions of the stereo images.

7. A system to generate a disparity map, the system comprises:
a machine readable medium having processor executable instructions stored thereon; and
a disparity map estimator including a processor to execute the instructions to:
generate an estimation of a disparity map for a stereo pair of images based on multiple disparity assignments and a matching cost for each disparity assignment, wherein generating the disparity map estimation comprises (i) segmenting the stereo images, (ii) determining if each segment is doubtful or un-doubtful, wherein a doubtful segment does not comprise a block of pixels greater than $n_d \times n_d$ blocks and for each doubtful segment, defining a window $W_s$ as pixels (i,j) where a distance between each pixel (i,j) and the doubtful segment is less than $n_d$, and (iii) calculating a matching cost for both doubtful and un-doubtful segments wherein the matching cost calculation for a doubtful segment is based on the window $W_s$ and the matching cost calculation for an un-doubtful segment is not based on the window $W_s$;

determine disparity candidates based on a matching cost minimum of the doubtful and un-doubtful segments;

assign the disparity candidates to one of a plurality of segment classifications based on the matching cost minimum of the doubtful and un-doubtful segments; and generate a final disparity map by refining the estimated disparity map.

8. The system of claim 7, wherein the segments each include a plurality of pixels having a color distance within a threshold of each other.

9. The system of claim 8, further comprising:

determining disparity candidates based on the matching cost minimum of the segments; and assigning the disparity candidates to one of a plurality of segment classifications based on the matching cost minimum of the segments to generate the estimated disparity map of the stereo images.

10. The system of claim 9, wherein each of the segment classifications of the plurality of segment classifications includes a distinct level of segmentation information.

11. The system of claim 7, further comprising:

downscaling the stereo images by a predetermined factor before the generation of the estimated disparity map; and upscaling the estimated disparity map after the generation thereof by the predetermined factor.

12. The system of claim 7, wherein the disparity map estimation applies to occluded regions of the stereo images.

13. A system to generate a disparity map, the system comprises:

a memory;

a machine readable medium having processor executable instructions stored thereon; and a processor to execute to instructions to:

generate an estimation of a disparity map for a stereo pair of images based on multiple disparity assignments and a matching cost for each disparity assignment, wherein generating the disparity map estimation comprises (i) segmenting the stereo images, (ii) determining if each segment is doubtful or un-doubtful, wherein a doubtful segment does not comprise a block of pixels greater than $n_d \times n_d$ blocks and for each doubtful segment, defining a window $W_s$ as pixels (i,j) where a distance between each pixel (i,j) and the doubtful segment is less than $n_d$, and (iii) calculating a matching cost for both doubtful and un-doubtful segments wherein the matching cost calculation for a doubtful segment is based on the window $W_s$ and the matching cost calculation for an un-doubtful segment is not based on the window $W_s$;

determine disparity candidates based on a matching cost minimum of the doubtful and un-doubtful segments;

assign the disparity candidates to one of a plurality of segment classifications based on the matching cost minimum of the doubtful and un-doubtful segments; and generate a final disparity map by refining the estimated disparity map.

14. The system of claim 13, wherein the segments each include a plurality of pixels having a color distance within a threshold of each other.

15. The system of claim 14, further comprising:

determining disparity candidates based on the matching cost minimum of the segments; and assigning the disparity candidates to one of a plurality of segment classifications based on the matching cost minimum of the segments to generate the estimated disparity map of the stereo images.

16. The system of claim 15, wherein each of the segment classifications of the plurality of segment classifications includes a distinct level of segmentation information.

17. The system of claim 13, further comprising:

downscaling the stereo images by a predetermined factor before the generation of the estimated disparity map; and upscaling the estimated disparity map after the generation thereof by the predetermined factor.

18. The system of claim 13, wherein the disparity map estimation applies to occluded regions of the stereo images.

* * * * *